Sept. 25, 1956    V. F. MILLER    2,764,701
ELECTRICAL CONTROL APPARATUS
Filed Nov. 10, 1953    7 Sheets-Sheet 1
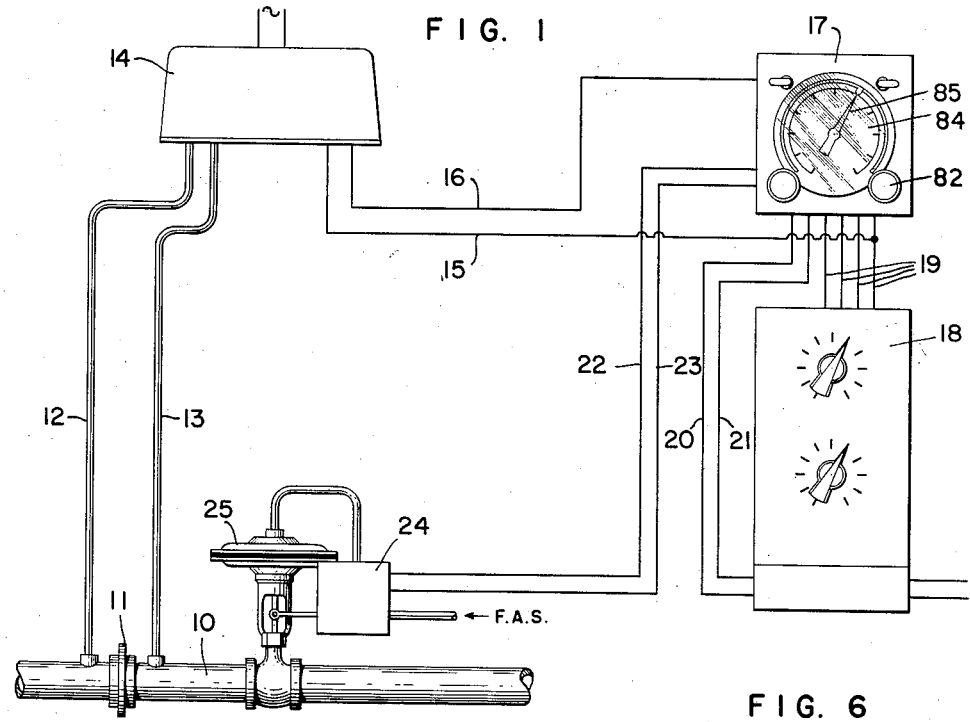
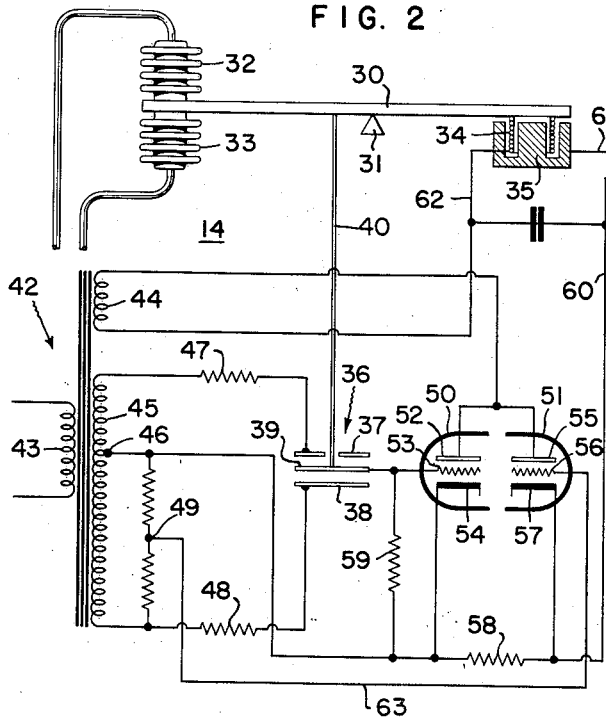
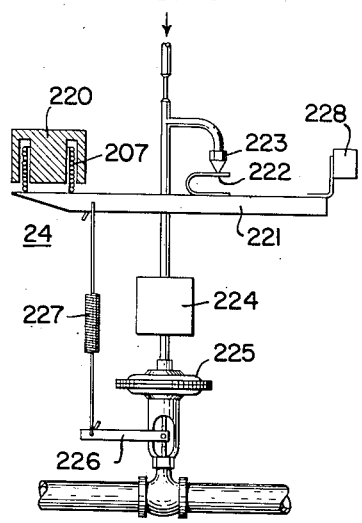
INVENTOR.
VERNON F. MILLER
BY Arthur H. Swenson
ATTORNEY.

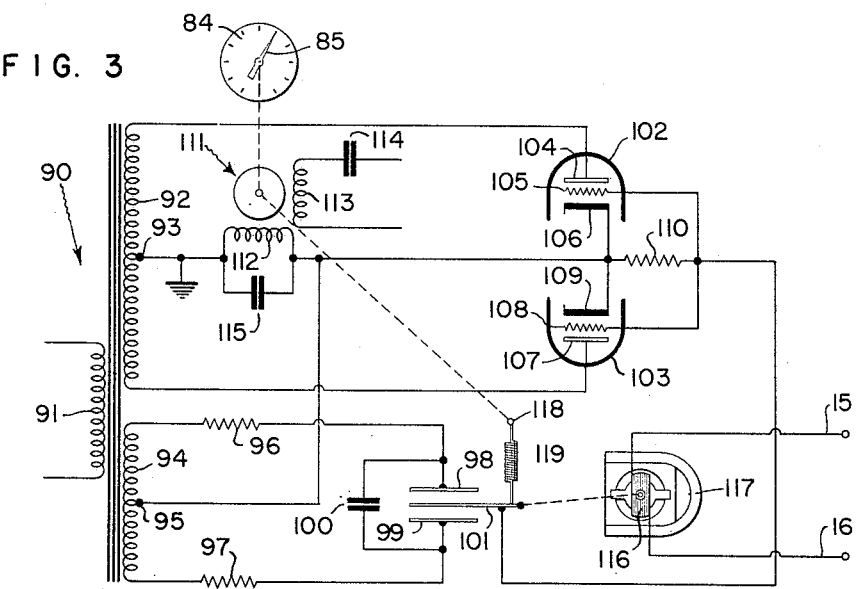

Sept. 25, 1956

V. F. MILLER 2,764,701

ELECTRICAL CONTROL APPARATUS

Filed Nov. 10, 1953

INVENTOR.
VERNON F. MILLER
BY Arthur H. Swanson
ATTORNEY.

Sept. 25, 1956  V. F. MILLER  2,764,701
ELECTRICAL CONTROL APPARATUS
Filed Nov. 10, 1953  7 Sheets-Sheet 4

AUTOMATIC

SEAL

MANUAL

INVENTOR.
VERNON F. MILLER
BY
Arthur H. Swanson
ATTORNEY.

Sept. 25, 1956    V. F. MILLER    2,764,701
ELECTRICAL CONTROL APPARATUS
Filed Nov. 10, 1953    7 Sheets-Sheet 5

*INVENTOR.*
VERNON F. MILLER
BY
ATTORNEY.

Sept. 25, 1956                V. F. MILLER                2,764,701
                        ELECTRICAL CONTROL APPARATUS
Filed Nov. 10, 1953                                 7 Sheets-Sheet 6

*INVENTOR.*
VERNON F. MILLER
BY Arthur H. Swanson
ATTORNEY.

Sept. 25, 1956 V. F. MILLER 2,764,701
ELECTRICAL CONTROL APPARATUS
Filed Nov. 10, 1953 7 Sheets-Sheet 7

INVENTOR.
VERNON F. MILLER
BY
*Arthur H. Swanson*
ATTORNEY.

ated Sept. 25, 1956

United States Patent Office 2,764,701
Patented Sept. 25, 1956

2,764,701

ELECTRICAL CONTROL APPARATUS

Vernon F. Miller, Wyncote, Pa., assignor to Minneapolis-Honeywell Regulator Company, Minneapolis, Minn., a corporation of Delaware Application November 10, 1953, Serial No. 391,208

18 Claims. (Cl. 307—116)

The general object of the present invention is to provide a new and improved electrical control apparatus which is adapted for use in the maintaining constant of the magnitude of a controlled variable. More particularly, the invention is concerned with a new and improved control apparatus characterized by its adaptibility to manual as well as automatic operation with the circuitry so arranged that the apparatus may be readily switched from manual to automatic or automatic to manual without any perceptible change in output or change in the controlled variable.

Automatic electrical controllers for maintaining constant the magnitudes of controlled variables have long been used. Such controllers to be universally adapted for use in all types of control problems require that the control have several features. One important feature is that the various components of the apparatus be separable over considerable distances without the controlling action of the controller being disturbed. Another feature which is desirable in electrical controllers is that the control apparatus incorporate some type of reset component for maintaining the condition of the controlled variable at an exact value regardless of the loading of the control system or changes in other factors which tend to cause the condition of the variable to droop or lag behind the desired value. Thus, in the control of temperature in a furnace, changes in the B. t. u. content of the fuel to the furnace, or the size of the load in the furnace, may cause the temperature of the furnace to lag or droop from the desired value. The present control with the reset component included will recognize this lag or droop and produce an output controlling action which will eliminate the deviation.

In controllers incorporating the automatic reset circuitry, the problem of switching the control apparatus between automatic and manual control becomes appreciable in that it is important that the reset circuitry be maintained in step with the manual control so that when a switching operation takes place there will be no sudden change in the output controlling action of the controller which change might upset the controlled variable.

In electrical control apparatus which does not incorporate automatic reset circuitry, manual reset circuitry may be included with the essential requirement for this type of controller being where it is to be switched between manual and automatic positions that means be provided for maintaining the automatic position of the controller in step with the operating conditions during the manual operation.

Another important feature of controllers of the present type is that they be readily adapted for cascade type of control. In other words, the controller must be so arranged that the output controller operation may be determined by two or more input controlling signals.

It is therefore a more specific object of the present invention to provide a new and improved control apparatus incorporating reset means with the circuit arranged to be maintained in step when the apparatus is switched from a manual mode of operation to an automatic mode of operation.

Another more specific object of the present invention is to provide an improved electrical control apparatus having an electrical controller incorporating automatic reset with the control apparatus being provided with means for switching between a manual mode of operation and an automatic mode of operation with circuit means for maintaining the electrical controller of the apparatus and the reset thereof in step with the manual mode of operation so that the apparatus may be switched between manual and automatic without any appreciable change in control apparatus output.

Still another more specific object of the present invention is to provide an improved electrical control apparatus incorporating an electrical controller having automatic reset therein with means provided in the apparatus for switching between a manual mode of operation and automatic mode of operation with the apparatus so arranged that when on manual operation the control apparatus output signal is compared with an output signal from the electrical controller with any differences in the signals being used to reset the output of the controller so that the apparatus may be switched between the manual and automatic position without introducing any perceptible change in the output of the control apparatus.

A further object of the present invention is to provide a new and improved control apparatus incorporating a pair of manually adjustable signal sources, one of which is used in the control apparatus as a set point adjustment when the apparatus is switched into an automatic position and the other source is used as a manual control source when the apparatus is switched to a manual position with means provided for maintaining the apparatus in step when the apparatus is switched between the manual and automatic positions.

A still further object of the present invention is to provide a new and improved electrical control apparatus which is particularly adapted for use in cascade control.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Of the drawings:

Fig. 1 is a diagrammatic showing of the control apparatus of the present invention applied to control a specific process;

Fig. 2 is a diagrammatic showing of a transmitter which may be used in the apparatus for converting an input pressure signal into a proportional electric current;

Fig. 3 shows a form of indicator apparatus for indicating the magnitude of the current in a circuit in the control apparatus;

Fig. 4 shows a form of set point current generating apparatus;

Fig. 5 shows a schematic layout of the electrical controller of the overall control apparatus;

Fig. 6 shows a form of electro-pneumatic valve positioner which may be used in the apparatus;

Figure 1

Figure 7:
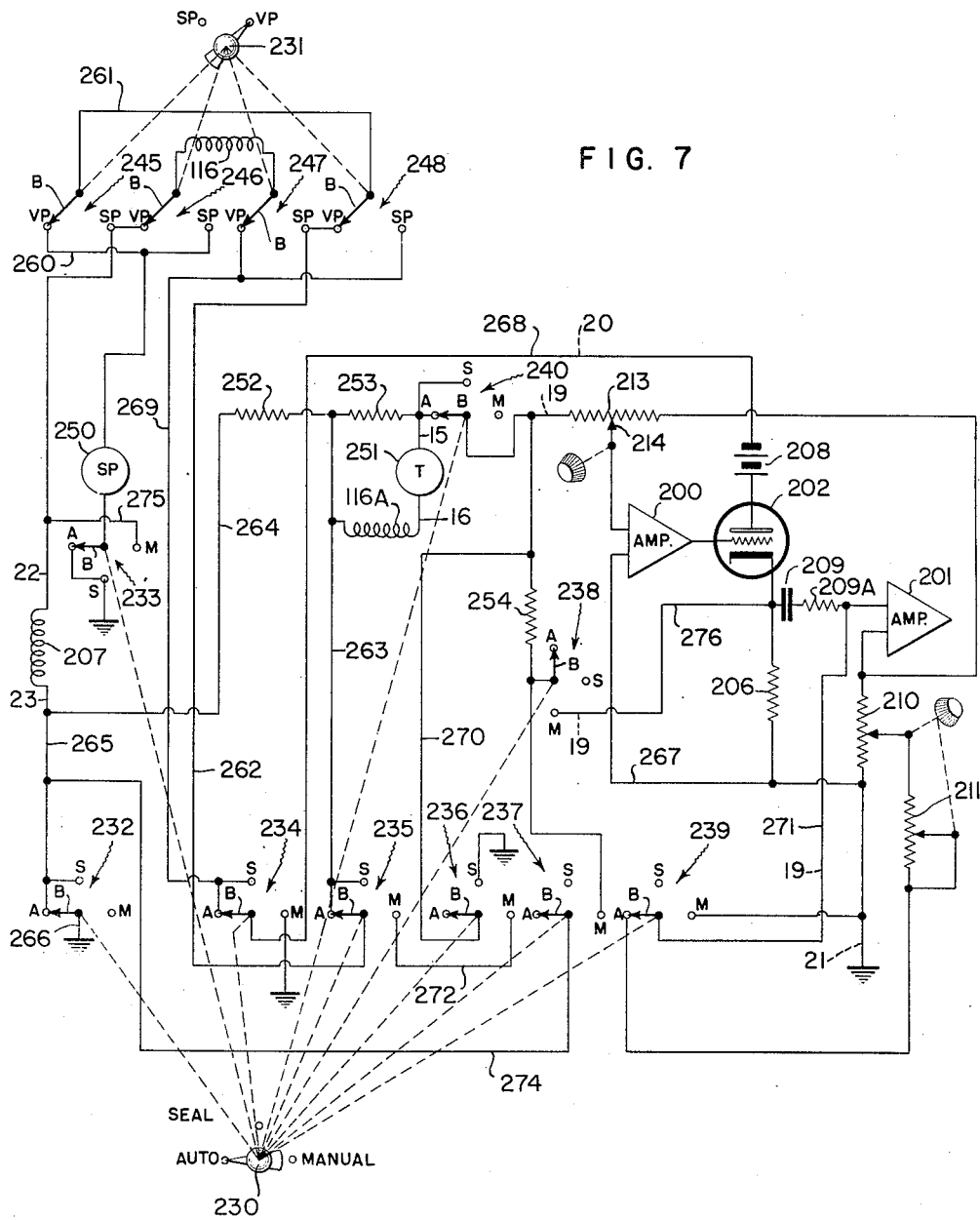
Fig. 7 shows one form of electrical switching circuitry that may be used to interconnect the various components of the control apparatus.

Referring first to Fig. 1, the numeral 10 represents a conduit through which is flowing a fluid. As represented in Fig. 1, the control apparatus is adapted to regulate the flow of this fluid and maintain the flow constant at a desired value. For sensing the flow in the conduit 10 an orifice plate 11 may be provided and a pair of pressure takeoffs 12 and 13 positioned on either side of the orifice plate. These in turn may be applied to a differential pressure converter type of instrument 14. This instrument is effective to transform the differential pressure in the conduits 12 and 13 into a proportional electrical current on electrical leads 15 and 16. The output electrical current from the leads 15 and 16 is applied to the input of an indicator and switching panel 17 where the signal is compared with a manually determined set point signal and applied to the input of the electrical controller 18 by the electrical leads 19.

The output of the electrical controller is applied by way of leads 20 and 21 back to the indicating and switching panel 17 and thence to output leads 22 and 23 which lead to an electric to pneumatic valve positioner 24. The valve positioner is arranged to control the operation of a pneumatic valve 25 which in turn is used to regulate the flow of fluid in the conduit 10.

Figure 10:
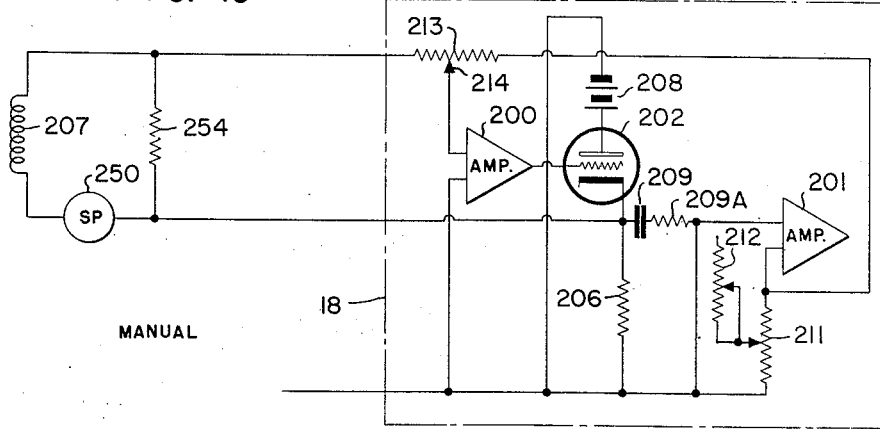
Fig. 10 is a schematic showing of the control apparatus of Fig. 7 when switched to the manual position.

Basically, the operation of this apparatus shown in Fig. 10 is that the rate of flow of the fluid is determined by the differential pressure in the lines 12 and 13 with the differential pressure converted to a proportional electrical signal in the output of the instrument 14. This output signal is applied to the switching and indicating panel 17 to be compared with a set point signal. If there is a difference between the set point signal and the transmitted signal from the instrument 14, the controller 18 will have an input and will produce an appropriate output control action which will be applied by way of the leads 20 and 21, and 22 and 23 to the electric to pneumatic valve positioner 24. The valve positioner 24 will in turn position the valve 25 so as to maintain the desired flow of the fluid in the conduit 10.

As will be hereinafter explained, the controller 18 incorporates both proportional and reset action. Further, while the apparatus is shown to control flow, it will be obvious that it can be used to control the magnitude of any variable, such as liquid level, temperature, or the like.

Figure 2

The circuit of Fig. 2 shows a transmitter which is effective to produce an output current which is proportional to the differential pressure applied to the input thereof. For this purpose, there is provided a beam 30 which is pivoted at 31 and has applied thereto, by a pair of differential pressure sensing bellows 32 and 33, a force proportional to the differential pressure applied to the input. For balancing this input force there is provided a force balancing current coil 34 which is attached to the beam 30 and which cooperates with a permanent magnet 35. For sensing the movement of the beam 30 there is provided a condenser 36 having a pair of fixed condenser plates 37 and 38 and a movable condenser plate 39 which is attached to the beam 30 by a connection 40.

Electrical power is supplied to the input of the apparatus by means of a transformer 42 having a primary winding 43 and a pair of secondary windings 44 and 45. The secondary winding 45 is tapped at 46. The secondary winding 45 is connected to the fixed plates of condenser 46 by means of resistors 47 and 48. Connected across the lower half of the secondary 45 is a voltage divider 49 comprising a pair of series connected resistors with a tap therebetween.

The secondary winding 44 is arranged to supply electrical energy to a pair of amplifying devices 50 and 51. The device 50 comprises an anode 52, a control electrode 53, and a cathode 54. The device 51 comprises an anode 55, a control electrode 56, and a cathode 57. Connected between the cathodes 54 and 57 is a resistor 58 while a further resistor 59 is connected across the input of the device 50.

In considering the operation of Fig. 2, it is first assumed that the movable electrode or plate 39 is centered between the fixed plates 37 and 38 so that there is no resultant output electrical signal appearing on the center plate 39. This will mean that there will be no input signal applied to the control electrode 53 which is connected to the plate 39. With no input signal applied to the device 50, the control electrode 53 will be effectively connected to the cathode 54 and the device 50 will act as a diode and will be conducting during the half cycle on which the upper end of the secondary 44 is positive with respect to the lower end. This will mean that current will flow in a circuit that may be traced from the upper end of the secondary 44 to the parallel connected amplifying devices 50 and 51, output lead 60, lead 61, feedback coil 34, and lead 62 back to the lower end of the secondary 44. The current flow in the last traced circuit due to the device 51 will be dependent in part upon the amount of biasing action on the device 51 caused by the current flow from the device 50 flowing through resistor 58 as well as the biasing potential derived from the voltage divider 49 as applied to the input control electrode 56 by way of lead 63. There will thus be flowing through the output leads 60 and 61 a series of direct current pulses whose average amplitude is indicative of a balanced condition.

If there should be a change in the differential pressure affecting the bellows 32 and 33, the movable plate 39 will be displaced from a center position and the devices 50 and 51 will change their output currents. The change in the output current will be reflected through the force balancing coil 34 to balance the change in force resulting from the change in differential pressure in bellows 32 and 33.

It will thus be seen that the output current on leads 60 and 61 will be proportional to the differential pressure applied to the bellows 32 and 33 and this current will be useful in the control apparatus as will be hereinafter explained.

Figure 3

The electrical circuit of Fig. 3 is one form that the electrical circuit for the indicator may assume. This circuit is likewise a force balance circuit wherein a force created by an input signal is balanced by a second force indicative of output motion.

The circuit of Fig. 3 comprises an input transformer 90 having a primary winding 91, a secondary winding 92 tapped at 93 and a secondary winding 94 tapped at 95. Connected to the secondary winding 94 are a pair of resistors 96 and 97 and a pair of fixed condenser plates 98 and 99. Connected across the condenser plates 98 and 99 is a fixed condenser 100. A movable plate 101 is arranged between the two fixed plates 98 and 99.

The secondary section 92 is arranged to supply electrical energy to a pair of amplifying devices 102 and 103. The device 102 has an anode 104, a control electrode 105 and a cathode 106 while the device 103 comprises an anode 107, control electrode 108, and a cathode 109. A resistor 110 is connected between the cathodes and control electrodes of the device 102 and 103. Connected in the output circuit of the devices 102 and 103 is a motor 111 having an amplifier winding 112 and a line winding 113, the latter having a condenser 114 in series therewith. A condenser 115 is connected in parallel with the amplifier winding 112. This motor is of conventional type and is adapted to be reversibly operated in accordance with the phasing of the electrical signal applied to the amplifier winding 112.

The input signal to this apparatus is by way of leads 15 and 16 and is applied to a coil 116 which is arranged to cooperate with a permanent magnet 117. The motor 111 is arranged to drive the indicator needle 85 and also provide, through a gearing arrangement 118 and spring 119, a force balancing feedback action to the coil 116.

In considering the operation of Fig. 3 it is first assumed that the movable plate 101 is centered between the fixed plates 98 and 99. When so centered, the plate 101 will be electrically at the same potential as the point 95 on the secondary 94. The signal on the plate 101 will be transferred by way of lead 120 to the input of devices 102 and 103. The electrical signal from the tap 95 is applied by way of lead 121 to the cathodes of the devices 102 and 103. With no signal on the leads 120 and 121, the devices 102 and 103 will be conducting on alternate half cycles and producing a double frequency pulse in the motor winding 112. This pulse will not be effective to drive the motor 111 and it will remain in a fixed position.

If the current condition in the leads 15 and 16 should change so that the force acting upon the vane 101, as produced by the coil 116, changes, the blade 101 will be moved from its central position. If the blade is moved in an upward direction, there will be an unbalance condition created on the output blade 101 with the phasing of the blade being closer to that of the upper end of the secondary 94. It is assumed that the phasing of the secondaries 92 and 94 are the same so that with the blade 101 moved in an upward direction, during the half cycle when the upper end of the secondaries 92 and 94 are positive, the output phasing will be such as to cause the device 102 to conduct more during its conducting half cycle. On the following half cycle, the phasing of both secondaries 92 and 94 will reverse and a more negative signal will be applied to the device 103 with the result that the device 103 will conduct a pulse which is of lesser magnitude than under the above assumed balance condition. The result of this unbalance will be an electrical motor drive signal of the basic frequency which will be effective to drive the motor 111 in a direction to change the force created by the spring 119 acting upon the coil 116 so that the coil will tend to move back to a balance position. Movement of the motor 111 will result in the repositioning of the indicator needle 85 upon the dial 84.

If the current change in the input leads 15 and 16 should be in the opposite direction, the blade 101 will be displaced downwardly and a reversely phased signal will be produced in the output on leads 120 and 121. This reversely phased signal will result in the device 103 conducting more than the device 102 and the phasing of the motor drive signal will be reversed 180° so as to cause reverse operation of the motor. As before, the repositioning of the motor will cause the indicator needle 85 to assume a new position and the gear 118 acting through spring 119 to produce a new force to balance the change in the input force created by the current from the leads 15 and 16.

*Figure 4*

The electrical circuit of Fig. 4 is a representative circuit for obtaining a set point current for the overall control apparatus. This circuit is balanced by a force proportional to the output of the apparatus.

More specifically, the circuit of Fig. 4 comprises an input transformer 125 having a primary winding 126 and a secondary winding 127. Connected in series with the secondary 127 is a conventional rectifier 128 while a bypass condenser and filter condenser 129 are connected across the secondary 127 of the output of the rectifier 128. A pair of triode devices 130 and 131 are also connected to the secondary 127. The device 130 comprises an anode 132, a control electrode 133, and a cathode 134 while the device 131 comprises an anode 135, a control electrode 136, and a cathode 137. Connected to the input control electrodes are a parallel connected resistor 138 and a condenser 139. Also in the input to the devices 130 and 131 is a resonant tank circuit 140 which includes a tapped inductor 141 having a tap 142, an adjustable condenser 143, and a resistor 144.

A condenser 145 is connected in series with a resistor 146 having a condenser 147 in parallel therewith. The current output for the apparatus is on leads 148 and 149 and in series with this current output is a coil 150 which is arranged to cooperate with a permanent magnet 151. A mechanical connection 152 is provided to the condenser 143. The input force to the condenser 143 is supplied by way of the set point adjustment knob 82 acting through gearing 153 and spring 154 to apply a variable biasing force to the movable plate of the condenser 143. The knob 82 is also directly connected to a movable dart, not shown, which cooperates with the indicator dial 84, shown in Fig. 3.

The operation of the circuit of Fig. 4 is based upon the principle that the current flow in an oscillator circuit will be dependent in part upon the tuning of the resonant circuit of the oscillator. The oscillator in the present arrangement includes the devices 130 and 131 acting in parallel with the output and input of the devices 130 and 131 being coupled to the resonant tank circuit 140. The rectifier 128 and condenser 129 will establish, with the other circuitry, a D. C. potential for the tubes 130 and 131. A current flow circuit may be traced through the rectifier 128, the parallel connected devices 130 and 131, conductor 156, the lower portion of the coil 141 from tap 142, coil 150, output terminals 149 and 148, and conductor 157 back to the lower terminal of the secondary 127. The current through the lower section of the coil 141 will induce a signal in the upper section and this signal will be applied to the control electrode 136 in a regenerative manner so as to set up oscillations in the circuit. The frequency of oscillations will be determined in part by the tuning of the resonant tank circuit as adjusted by the positioning of the movable condenser plate of the condenser 143. For a particular input force to the movable plate of the condenser 143 by the spring 54, the oscillator section will produce an output current which, when flowing through the coil 150, will produce a counterbalancing force attempting to maintain the movable blade in a fixed position. The current necessary to accomplish this balance is the set point current of the system. The changing of the set point current is accomplished by adjustment of the knob 82 which in turn will change the force of the spring 54 acting upon the movable blade of the condenser 143.

The particular circuit at hand is desirable when the circuit constants thereof are selected so that the resonant tank circuit 140 has a relatively low Q. When so selected, it is possible to attain substantially linear changes in output current for linear changes in the setting of the input knob 82 so that ready calibration between the dart of the indicator dial and the output current from the circuit may be accomplished.

*Figure 5*

The electrical circuit of Fig. 5 shows a preferred form of the controller of the present apparatus. The details of this electrical controller will be found in a copending application of William F. Newbold, entitled "Electrical Control Apparatus," Serial No. 366,037, filed July 31, 1953.

The controller circuit includes a pair of balanced amplifiers 200 and 201. The amplifier 200 has its output connected to an output control device 202 having an anode 203, a control electrode 204, and a cathode 205. The output of the device 202 includes a resistor 206 and a galvanometer coil 207 which may be a part of the valve positioner 24. A battery 208 is shown supplying energy to the device 202. The input to the amplifier section 201 includes a reset condenser 209, a resistor 209A in series therewith, and a pair of adjustable resistors 210, and 211, said resistors providing an adjustment for the reset rate of the controller. A feedback connection from the amplifier section 201 is provided by lead 212 which leads to an adjustable proportional band slidewire 213 having a tap at 214.

The operation of Fig. 5 may best be considered by first assuming that there is no input signal applied to the input on leads 19. It is further assumed that there is no voltage or charge accumulated on the reset condenser 209. Under these circumstances, the output current of the device 202 will be a fixed value which will remain fixed so long as the input to the controller remains zero. If a step input should be applied to the terminal input leads 19, this input will be amplified by the amplifier 200 and applied to the control device 202 which will produce an output control current which will vary proportionally with the magnitude of the step input. Connected across the resistor 206 is the condenser 209 and the reset resistors 210 and 211 which provide the input for the amplifier device 201. With a step input, the condenser 209 will effectively pass the leading edge of the step and a feedback signal will be immediately applied by way of the lead 212 back to the proportional band slidewire resistor 213 which will effectively apply a balancing signal to the input step signal. If the step signal remains, the condenser 209 will be slowly charged and in order for a balanced condition to be maintained on the input of the amplifier 200, it is necessary that the output thereof be continuously changing. Thus, the reset network will gradually effect an increase in the output current of the device 202. This gradual increase will continue so long as this input signal remains. If the input signal should go to zero, the condenser 209 will tend to maintain the current flow last established in the device 202 so as to hold the output current from the device 202 at a fixed value. If it is desired to increase the reset rate of the apparatus, it is but necessary to decrease the amount of resistance in the circuit with the condenser 209. As is pointed out in the above mentioned copending application, the gain of the amplifier 201 is one of the factors in determining the overall time constant for the condenser 209.

The proportional band resistor 213 and its associated slider 214 are effective to determine the amount of output current change from the device 202 which may be expected for a particular unitary input signal on the input leads 19.

*Figure 6*

Fig. 6 shows an electro-pneumatic valve positioner in schematic form. The preferred form of this valve positioner will be found in a copending application of William J. Popowsky, entitled "Control Apparatus" filed on July 2, 1953 and bearing Serial No. 365,757. The input to the valve positioner is an electric current which is applied to the input coil 207. This coil cooperates with the permanent magnet 220 in creating a variable force upon a beam 221, said force varying by an amount proportional to the current flowing in the coil 207. The motion of the beam 221 is effective to displace a flapper 222 with respect to a nozzle 223 to change the back pressure of the nozzle. The nozzle back pressure is in turn applied to a suitable pneumatic relay 224 with the output pressure of the pneumatic relay being applied to the valve 25. The output of the valve is detected by means of a beam 226 which is attached to the output element of the valve and the output motion is used to force balance the beam 221 by means of a spring 227 which is connected between the arm 226 and the beam 221. The beam 221 carries a weight 228 at the end opposite the coil 207 so as to maintain the beam balanced.

In operation, the apparatus of Fig. 6 is arranged so that with a particular input current to the coil 207 there will be produced a force upon the beam 221 which force will move the flapper 222 with respect to the nozzle 223 and create a proportional output pressure. The output pressure from the nozzle 222, as passed through the relay 224, will control the positioning of the valve 25. The valve 25 will in turn produce an output feedback action by way of the arm 226 and spring 227 to force balance the beam 221 back toward its originally assumed position.

*Figure 7*

The circuit shown in Fig. 7 is one form of switching circuit which may be used with the present apparatus. The electrical circuit is arranged to be switched by a pair of manual switches 230 and 231. The switch 230 comprises a plurality of switching stacks each of which is a three position switch and these stacks are identified by the numerals 232, 233, 234, 235, 236, 237, 238, 239, and 240. The automatic position contacts of the individual switches are identified by the letter A, the seal position contacts of each of the switches are identified by the letter S and the manual position contacts are identified by the letter M. The letter B identifies the switch blade in each of the individual switches.

The manual switch 231 contains a plurality of stacked switches, each of these stacks comprising a single pole double throw switch. These stacks are identified by the numerals 245, 246, 247, and 248. The contacts of the switches are identified by the letters VP, for valve position and SP, for set point. The letter B identifies the switch blade in each of the respective switches.

The set point source of the control apparatus is identified by the numeral 250. The apparatus for this source is the apparatus shown in Fig. 4. The numeral 251 identifies the transmitter source and this transmitter source may correspond to the apparatus shown in Fig.

Associated with the set point source 250 is a resistor 252 while associated with the transmitting source 251 is a further resistor 253. A further resistor 254 is arranged to be connected to the input of the controller of the apparatus. Corresponding components of other elements in the circuit shown in Fig. 7 correspond to the individual components that have been explained in the explanation of the preceding figures.

The circuit as shown in Fig. 7 is connected in the automatic position and the indicator is connected to read valve position. The simplified circuit showing of the automatic position will be seen in Fig. 8 wherein it will be noted that the set point source 250 is connected in series with a resistor 252 and the transmitting source 251 is connected in series with resistor 253 by way of the indicator coil 116A.

The voltages on the two resistors 252 and 253 are effectively in opposition and are applied to the input of the controller 18. If there is an input signal, there will be an output from the controller through the indicator coil 116 and the valve positioner coil 207 and the character of this current will be dependent upon whether the input error signal, the difference between the set point and transmitter sources, is continuous or transient. If it is continuous, there will be a slow changing of the output current through the valve positioner coil 207 due to the action of the reset condenser 209 and its associated circuitry.

Referring back to Fig. 7 the automatic circuitry may be traced in the following manner. The set point source is connected to produce a voltage drop across the resistor 252 in a circuit that may be traced from the upper terminal of the set point source through lead 260, contact VP of switch 245, blade B, lead 261, blade B of switch 248, switch contact VP, lead 262, switch blade B of switch 235, contact A, lead 263, resistor 252, lead 264, lead 265, switch contact A of switch 232, grounded blade B which is grounded at 266, and ground contact A of switch 233 through blade B to the lower terminal of the set point source 250. The resistors 252 and 253 are connected in series to the input of the controller at the right end of the proportional band resistor 213 by way of the contact A and blade B of switch 240. The other input to the controller is by way of the grounded lead 267.

The output from the controller portion of the apparatus will be from the device 202 and may be traced from the anode of the device through the battery 208, lead 268, blade B and contact A of switch 234, lead 269, contact VP and blade B of switch 247, coil 116, blade B and contact VP of switch 246, valve positioner coil 207, lead 265, contact A and switch blade B of switch 232, grounded lead 266 back to the grounded lead 267 through resistor 206 to the cathode of the output device 202.

Figure 9:
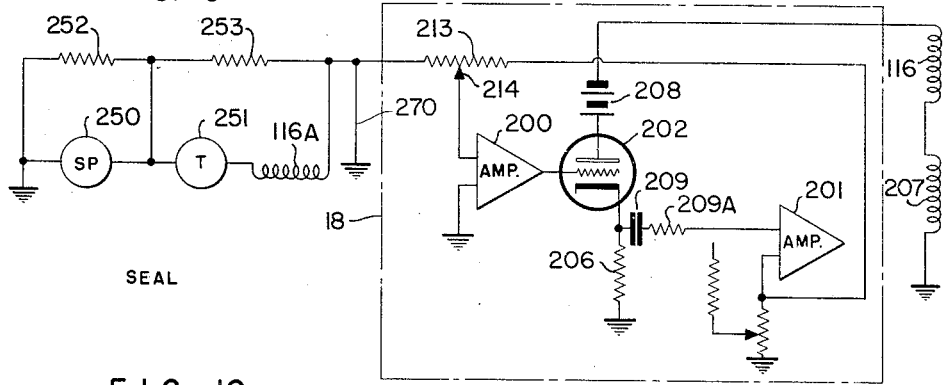
Fig. 9 is a schematic showing the electrical circuit of Fig. 7 when switched to the seal position.

When the apparatus is switched to the seal position, it is desired that the controller output current maintain its output current at a value corresponding to that immediately prior to the switching from the automatic position. The seal position is shown in Fig. 9, in schematic form, without the switching circuits of Fig. 7 included. In order to maintain the controller output current constant, the input to the controller is short circuited by lead 270. Further, the resistors associated with the reset condenser 209 have been disconnected therefrom so that the condenser is effectively floating and will not change in potential.

Referring back to Fig. 7, the seal position may be traced by first noting that the input to the controller on the left end of the proportional band adjusting resistor 213 is shunted to ground by lead 270 and switch 236 by way of switch blade B and switch contact S. The condenser 209 will become floating since the lead 271 which connects to the right end of the condenser 209 passes to the switch 239 at blade B and contact S, the latter of which is floating. The output current for the controller will pass through a circuit which corresponds to the output circuit traced for the automatic position with the exception that the contact of the switches involved in the output circuit will be the S contacts instead of the A contacts.

When the apparatus is switched to the manual position, it is desired that the automatic reset of the apparatus be maintained in step with the manual signal used to position the valve. Referring first to Fig. 10, it will there be noted the manner in which the controller output is maintained in step with the set point signal. The set point source 250 is connected directly in series with the valve positioner coil 207 and resistor 254. It will further be noted that the input to the controller will be a signal derived from the voltages existing on the output resistor 206 and the resistor 254. If the voltages across the resistors 206 and 254 are equal, the controller will have no input signal and the charge on the reset condenser 209 will remain fixed. However, if there is a difference between the voltages across the resistors 206 and 254, the controller will have an input and there will be a change in the output until such time as that voltage difference is eliminated. Thus, if the magnitude of the voltage across the resistor 254 is larger than that across the resistor 206, the controller will see this difference and produce an output current change which will bring the voltage on resistor 206 to the same value as that across 254.

Referring back to Fig. 7 with the apparatus switched to the manual position, it will be seen that the set point source 250 is connected through the resistor 254 to the valve positioner coil 207. This circuit may be traced from the upper terminal of the source 250 to lead 260, contact VP and blade B of switch 245, lead 261, blade B and contact VP of switch 248, lead 262, blade B and contact M of switch 235, lead 272, contact M and blade B of switch 236, lead 270, resistor 254, contact M and blade B of switch 237, lead 274, lead 265, valve positioner coil 207, lead 275, contact M and blade B of switch 233, back to the lower terminal of the set point source 250.

The resistor 206 and the resistor 254 are connected to the input of the controller by a circuit that may be traced from the lower terminal of the resistor 206 through the resistor, lead 276, contact M and blade B of switch 238, resistor 254 to the left end of the proportional band resistor 213.

The output of the controller output device 202 is grounded in a circuit that may be traced from the upper terminal of the battery 208 through lead 268, blade B and contact M of switch 234, ground, resistor 206, and triode 202 back to the lower terminal of the source 208. As mentioned above, when the apparatus is in the manual position, the output current of the controller will be maintained in step with the electrical current from the set point source 250 flowing through the valve positioner coil 207. To speed up the reset rate, the condenser 209 is connected in parallel with the resistor 206 by way of switch 239, when switched to the manual position.

The apparatus when switched from the manual back to the automatic position should be aligned if manual adjustments have been made. Thus, while on manual, the operator may adjust the set point source 250 until the controlled variable is at a desired value. The apparatus is then switched to the seal position at which time the switch 231 is switched to the seal position SP. The set point source is then adjusted until the dart on the indicator is in alignment with the needle of the indicator indicating the magnitude of the current from the transmitter source 251. When the set point source and transmitter source have equal signals, the apparatus may be switched to automatic and there will be no bump.

Figure 11:
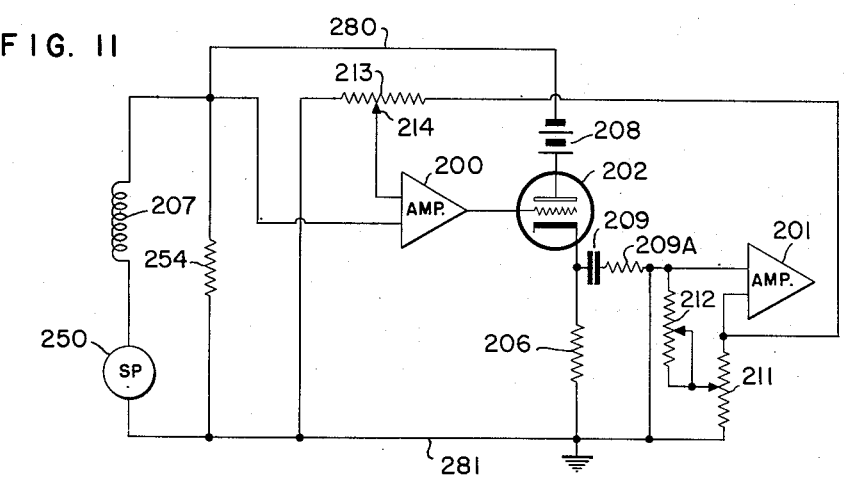
Fig. 11 shows a modified form for connecting the electrical circuit of Fig. 7 when in the manual position.

*Figure 11*

The electrical circuit shown in Fig. 11 is a modification of the circuit shown in Fig. 10 and Fig. 7. The circuit shown in Fig. 11 is a manual position of the controller with the circuitry shown for maintaining the output current of the controller in step with the set point source 250. This is accomplished in the present arrangement by connecting the set point source 250 through valve positioner coil 207 to the resistor 254. Further, the output of the output device 202 is connected to the resistor 254 in a circuit that may be traced from the upper terminal of the battery 208 through lead 280, resistor 254, lead 281, resistor 206 and device 202 back to the lower terminal of the source 208. The electrical signals of the set point source on the output of the controller are effectively in opposition so that if the output current of the controller is equal to the output current of the set point source there will be no voltage appearing across the resistor 254. If there is a difference between the two output currents, there will be an output signal which will be indicative of controller output current error and the controller will sense this and make appropriate adjustment. As with the previous circuit, when the controller is in step with the set point source, it is possible to switch from manual to automatic without any perceptible change in the output current. As with Fig. 7, the condenser reset rate may be increased by connecting the condenser 209 in parallel with resistor 206 when on manual.

Figures 12, 13 and 14

Figure 12:
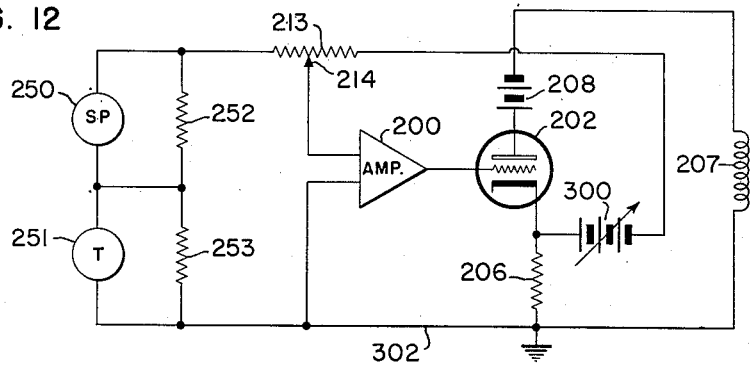
Fig. 12 is a schematic showing of an electrical circuit incorporating manual reset.
Figure 13:
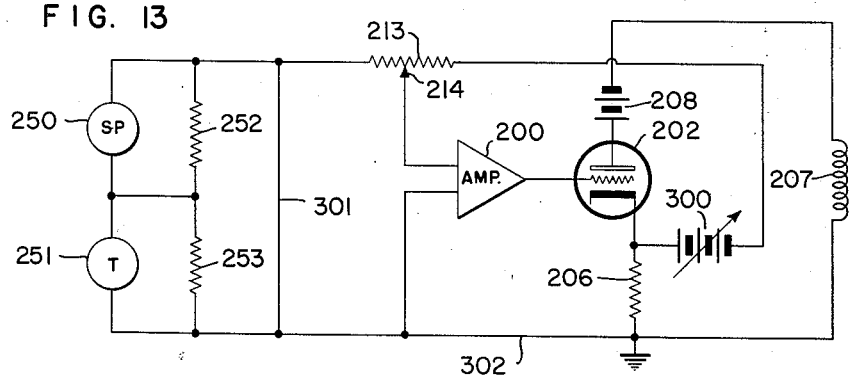
Fig. 13 is a schematic showing of the circuit of Fig. 12 when the circuit is switched to the seal position.
Figure 14:
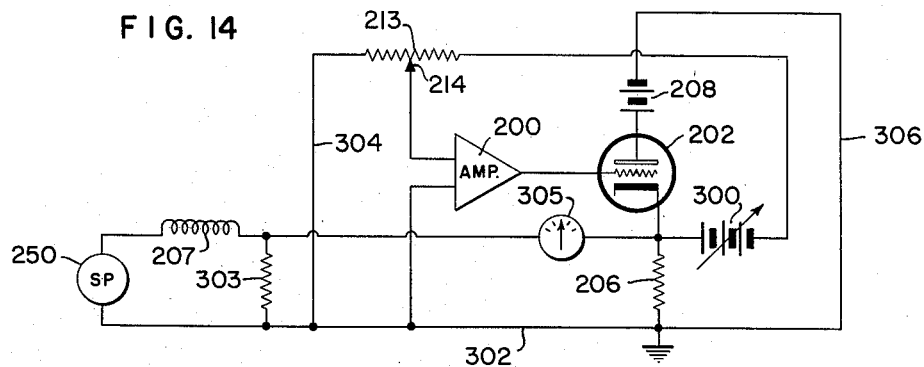
Fig. 14 is a schematic showing of the circuit of Fig. 12 when switched to the manual position.

Figs. 12, 13 and 14 all show an electrical controller which incorporates manual reset instead of the automatic reset which was considered in connection with Fig. 7 and the related figures. As with the automatic reset, it is essential that when the apparatus is switched from the manual to the automatic position that the controller output current be the same as that of the set point current in order that there be no sudden change in the current flow to the valve positioner coil which would tend to upset the process or variable which is being controlled.

Referring specifically to Fig. 12, the components corresponding to the components used in Fig. 7 carry the same reference numerals. The principal change is in the controller wherein the feedback circuit comprises an adjustable direct voltage source 300 which source is connected between the upper terminal for the resistor 206 back to the right hand terminal of the proportional band resistor 213. This adjustable source 300 is effective to vary the magnitude of the feedback voltage and establish a predetermined level of output current in the device 202 and therefore through the valve positioner coil 207. The switching circuits for the apparatus of Fig. 12 have not been shown in order to simplify the consideration of the circuit. It will be obvious, however, that a switching system of the type used in Fig. 7 may be used in connection with Fig. 12 as well as Figs. 13 and 14.

The operation of the circuit in Fig. 12 will correspond to the operation of Fig. 7 with the exception that there will be no gradual change in the output current of the controller through coil 207 because there is no automatic reset provided in this circuit. If there is a continued drooping or offset of the controlled variable from the set point value, adjustment of the manual reset source 300 will be effective to bring the control current back to the desired value.

In order to operate the controller in the seal position, it is necessary that the input to the controller be short circuited. This is accomplished, in Fig. 13, by a shorting lead 301 which connects the left hand terminal of the proportional band resistor 213 to the grounded lead 302. The output current of the device 202 will be dependent upon the adjustment of the manual reset source 300. The current flow will remain constant so long as the source 300 remains constant.

The circuit of Fig. 14 shows the apparatus in the manual position. Here, the set point source 250 is connected in series with the valve positioner coil 207 by means of a resistor 303. The controller input is effectively short circuited by the lead 304 which connects the left end of the proportional band resistor 213 to the grounded lead 302. For determining when the controller output current is equal to the set point current, there is provided a zero center instrument 305. The output of the device 202 is connected directly to the grounded lead 302 by lead 306.

When the circuit of Fig. 14 is in operation, the set point source will be supplying a control signal to the valve positioner coil 207 through the resistor 303 and producing a voltage drop across the resistor 303 proportional to the current flow on the circuit. Further, with the input to the controller short circuited by the lead 304, the controller output current will be dependent upon the setting of the manual reset source 300. As the controller output current will be passing through the output resistor 206, this resistor will have a voltage drop proportional to current flow in the output. By connecting the meter 305 between the upper terminal of the resistor 303 and the upper terminal of the resistor 206, it is possible to observe when the voltages on the two resistors are equal. Thus, with a zero center instrument, the instrument will read zero when the voltages on the two resistors are equal and this will indicate that the current flows in the controller output and the set point source are equal so that the apparatus may be switched from the manual to the automatic position without danger of producing an output pulse in the valve positioner coil 207 which will upset the controlled variable.

Figure 15

Figure 15:
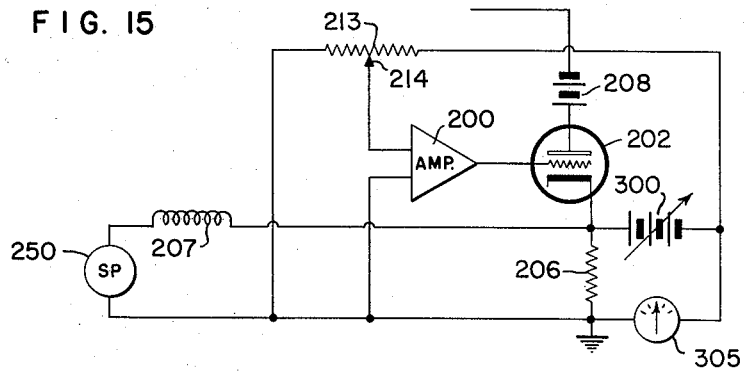
Fig. 15 is a modified circuit incorporating manual reset.

Fig. 15 is a modification of the circuit shown in Fig. 14 with the principal modification being in the connection of the set point source 250 through the valve positioner coil 207 to the output resistor 206. Further, the instrument 305 is connected to compare the voltages across the resistor 206 and the reset source 300. In addition, the anode circuit for the output device 202 is open circuited so that the only current flow through the resistor 206 will be the current flow due to the set point source 250.

The operation of the circuit of Fig. 15 will be substantially the same as that of Fig. 14 with the exception that the instrument 305 will now be comparing the voltage across the resistor 206 with the voltage across the reset source 300. Inasmuch as the reset source is manually adjusted, its output magnitude will not change when the control apparatus is switched back to the automatic position by switching means, not shown. This switching will be without any appreciable change in current flow through the device 207 when the voltages on the resistor 206 and source 300 are equal.

Figure 16

Figure 16:
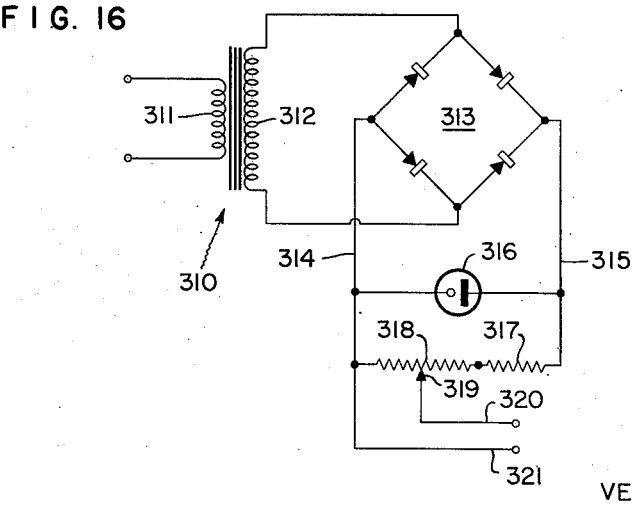
Fig. 16 is a form of current generating source which may be used in the control apparatus.

Fig. 16 shows a manually adjustable signal source which may be used to produce the manual reset signal or circuits of the type shown in Figs. 12 through 15. This circuit will be seen to comprise an input transformer 310 having a primary winding 311 connected to a suitable source of power, not shown, and a secondary winding 312. The secondary winding 312 is connected to the conventional rectifier bridge 313 which has a pair of output leads 314 and 315. Connected across the output leads 314 and 315 is a voltage regulator 316 which will serve to maintain the voltage across the leads 314 and 315 substantially constant. Connected in parallel with the voltage regulator 316 is a resistor 317 connected in series with a slidewire resistor 318, the latter of which has a slider 319 which may be used to variably select the magnitude of the voltage desired on the output leads 320 and 321.

Figure 17

Figure 17:
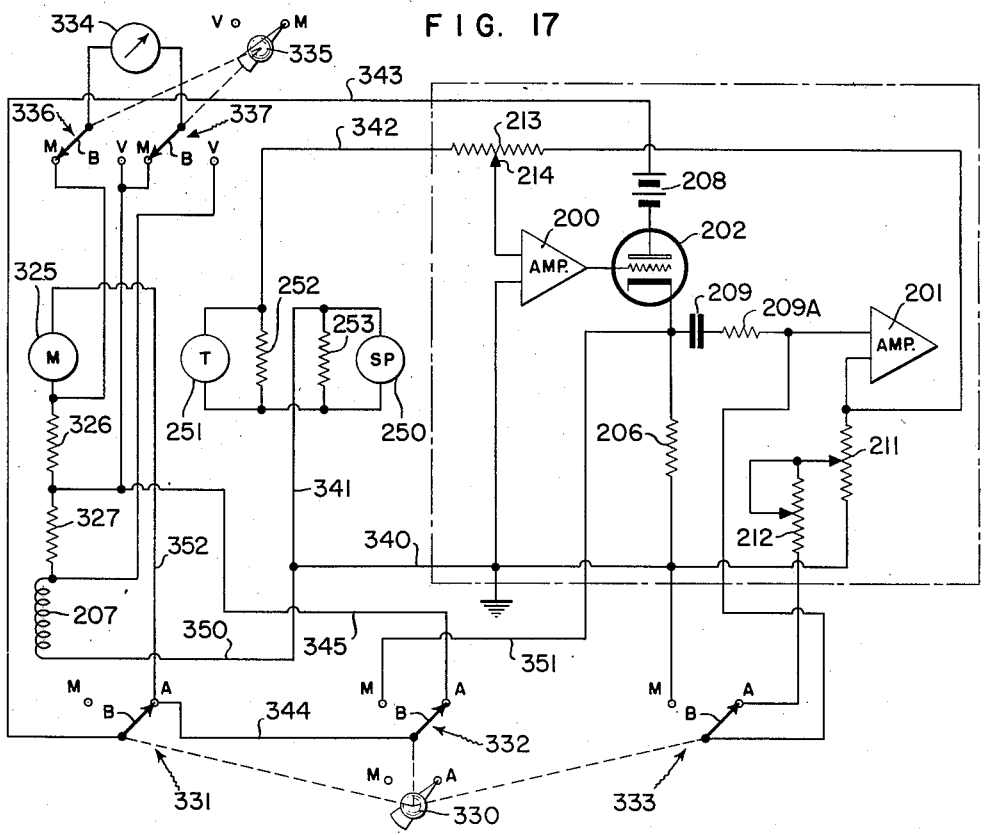
Fig. 17 is a modified type of control circuit incorporating two manually adjustable signal sources.

Fig. 17 shows a modified form of control apparatus incorporating the basic principles which have been outlined herein above. The present control apparatus incorporates the conventional set point source 250 which is used in automatic position and a second manually adjustable signal source 325 which is used when the apparatus is switched to the manual position. In series with the source 325 is a resistor 326 and in series with the valve position coil 207 is a further resistor 327.

The switching of the present figure is accomplished by a manual knob 330 which is connected to three separate switch stacks 331, 332, and 333 with each stack comprising a single pole double throw switch. The switch blade of each of the switches is identified by the letter B and the contacts for the manual position are identified by the letter M and those for the automatic position by the letter A.

There is additionally provided an indicating instrument 334 which is arranged to be switched into the electrical circuit for measuring valve position current or the current from the manually adjustable source 325 with the switching being accomplished by a manual knob 335. Manual knob 335 is connected to a pair of single pole double throw switches 336 and 337 with the contacts for the manual source being identified by the letter M, the contacts for the valve current being identified by the letter V, and the blades of the switch being identified by the letter B.

Figure 8:
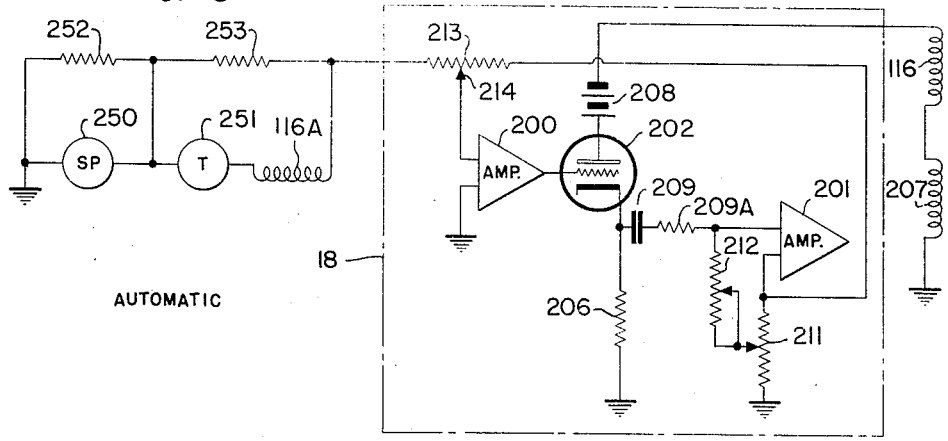
Fig. 8 is a showing of the electrical circuit of Fig. 7 when switched to the automatic position.

The apparatus as shown in Fig. 17 is in the automatic position and the electrical circuit is effectively the same as the circuit shown in Fig. 8. The input to the controller may be traced from the grounded lead 340 through lead 341, resistor 253, resistor 252, and lead 342 to the input of the controller at the left end of the proportional band adjusting resistor 213. The output of the controller may be traced from the upper terminal of battery 208 through lead 343, blade B and contact A of switch 331, lead 344, blade B and contact A of switch 332, lead 345, resistor 327, valve positioned coil 207, lead 350, ground lead 340, resistor 206, and device 202 back to the lower terminal of the battery 208. The circuit when so connected will operate in the manner explained above in connection with Fig. 8 with the controller maintaining the output current to the valve positioner coil 207 at a value which will tend to maintain the magnitude of the controlled variable constant.

When the apparatus is switched from the automatic to the manual position, the manually adjusted source 325 is arranged to supply current directly to the valve positioner coil 207. This circuit may be traced from the upper terminal of the source 325 through lead 352, contact A of switch 331, lead 344, blade B and contact M of switch 332, lead 351, resistor 206, lead 340, lead 350, valve positioner coil 207, and resistors 327 and 326 back to the source 325.

It will be noted that the above last traced circuit included the output resistor 206 in the output circuit of the device 202. When the switch 333 is moved from the automatic to the manual position, the condenser 209 is connected in parallel with the resistor 206 and in this manner accumulates a voltage which is proportional to the current which is originating from the manually adjustable source 325. This particular method of maintaining the reset in step is not new in the present application but will be found in a copending application of William F. Newbold, entitled "Electrical Control Apparatus," bearing Serial No. 391,207 and filed on even date herewith. While this particular method of keeping the reset in step is shown, it will be obvious that the method shown in Fig. 7 may also be used.

With the apparatus shown in Fig. 17, it is possible to switch from the manual to the automatic position without any manual intervention since the reset condenser 209 will always be maintained in step.

When the apparatus is switched from the automatic position to the manual position, it is necessary to provide some means for insuring that the manually adjustable source 325 has an output which corresponds to the output of the controller so that there will be no sudden change in the current flow through the valve positioner coil 207. It will be noted that the manually adjustable source 325 is in a completed electrical circuit when the apparatus is in the automatic position. This circuit may be traced from the upper terminal of the source 325 through lead 352, contact A, lead 344, blade B and contact A of switch 322, lead 345, and resistor 326 to the lower terminal of source 325. This source will be producing across the resistor 326 a voltage drop which voltage drop will be measured by the instrument 334 when the switch 335 is moved into the position M. When the switch 335 is switched to the V position, the instrument 334 is connected to observe the voltage across the resistor 327. When the controller is about to be switched from automatic to manual, it is necessary to readjust the source 325 so that the voltage observed by the instrument 334 will be the same when the instrument is connected across the resistor 326 or across the resistor 327. When the voltages are the same, the controller may be switched from automatic to manual without any bumping or surging of the output current.

Figure 18:
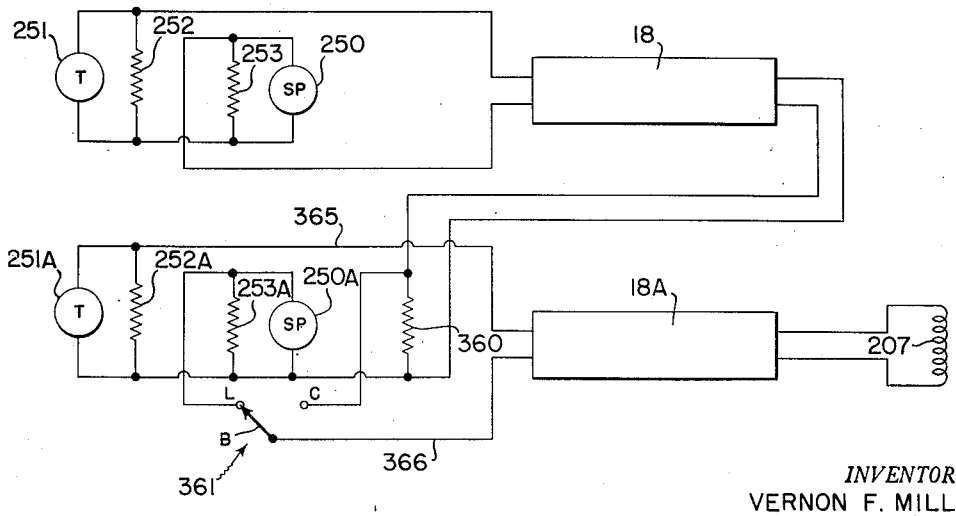
Fig. 18 shows one manner in which the present control apparatus may be connected for cascade control.

*Figure 18*

The circuit of Fig. 18 shows one manner in which the present control apparatus may be connected in cascade. As shown, two separate controls have been further connected so that two variables may be used to establish the output controlling action. The first controller which is at the top of the figure comprises a transmitting source and a set point source as well as an electrical controller, each of the components being identified by the reference numerals corresponding to those of Fig. 7. Immediately under this first control apparatus is a second control apparatus which is substantially the same as the first control apparatus and the components of this apparatus are identified by the same numerals followed by the latter A. A resistor 360 has been added into the circuit for effecting the cascade control and a switch 361 has been added for switching the control from local control to cascade control. The switch components include a blade B, a local contact L, and a cascade contact C. The output of the controller 18A is connected to a conventional valve positioner coil 207.

When the apparatus of Fig. 18 is switched to the position wherein local control is obtained, the blade B will engage contact L, as shown upon the drawing. When so connected, the controller 18A will receive an input signal from the transmitting source 251A which will be compared with the set point source 250A. The output current in the controller will be proportional to any difference between the two signals. In this arrangement the top control apparatus including a controller 18 will not be effective to produce any controlling action.

When the control apparatus is changed so that the switch 361 has the blade B engaging contact C, the apparatus is arranged for cascade control. When the apparatus is so connected, it will be noted that the controller 18 will have an input signal dependent upon the difference between the signal from the transmitting source 251 and the set point source 250. The output of the controller 18 will produce a voltage drop across the output resistor 360. This voltage drop will be substituted for the voltage originating from the set point source 250, used in the local position. The input to the controller 18A will then be a signal that may be traced from the lead 365, resistor 252A, resistor 360, contact C and blade B in switch 361, and lead 366 to the input of the controller 18A. The output current from the controller 18A will be dependent upon the difference in voltages existing across the resistor 360 and the resistor 252A. Since the voltage across the resistor 360 is dependent upon a signal originating from the transmitting source 251, it will be seen that there are two variables, by way of the source 251 and 251A, which are influencing the output current of the controller 18A as it flows through the valve positioner coil 207. It will be readily apparent that more controllers may be so interconnected to effect a more complex mode of cascade control.

While, in accordance with the provisions of the statutes, there has been illustrated and described the best forms of the invention, it will be apparent to those skilled in the art that changes may be made in the forms of the apparatus disclosed without departing from the spirit of the invention as set forth in the appended claims, and that in some cases certain features of the invention may be used to advantage without a corresponding use of other features.

Having now described my invention, what I claim as new and desire to secure by Letters Patent is:

1. Electrical control apparatus comprising, an adjustable signal source, a variable signal source, an electrical controller having reset means therein and having an input and an output, utilization means, switching means having an automatic and manual position, means including said switching means when in the automatic position connecting said adjustable and variable signal sources in opposition to the input of said controller and connecting said utilization circuit to said controller output, and means including said switching means when in said manual position connecting said adjustable source directly to said utilization circuit and connecting to the input of said controller a signal proportional to the signal applied to the utilization circuit and a signal proportional to the output of said controller.

2. Electrical control apparatus comprising, an adjustable signal source, a variable signal source, an electrical controller having reset means therein and having an input and an output, utilization means, switching means having an automatic, seal, and manual position, means including said switching means when in the automatic position connecting said adjustable and variable signal sources in opposition to the input of said controller and connecting said utilization circuit to said controller output, means including said switching means when in the seal position short circuiting the input of said controller, and means including said switching means when in said manual position connecting said adjustable source directly to said utilization circuit and connecting to the input of said controller a signal proportional to the signal applied to the utilization circuit and a signal proportional to the output of said controller.

3. Electrical control apparatus comprising, an adjustable signal source, a variable signal source, an electrical controller having reset means therein and having an input and an output, said controller having a resistor in the output circuit thereof, current utilization means, switching means having an automatic and manual position, means including said switching means when in said automatic position connecting said adjustable and variable signal sources in signal comparing relation to the input of said controller and connecting said utilization circuit to the output of said controller, and means including said switching means when in said manual position for connecting said adjustable signal source directly to said utilization means and connecting to the input of said controller a signal from said adjustable signal source and from the output of said controller across said resistor.

4. Electrical control apparatus comprising, an adjustable signal source, a variable signal source, an electrical controller having reset means therein and having an input and an output, said controller having a resistor in the output circuit thereof, current utilization means, a second resistor, switching means having an automatic and manual position, means including said switching means when in said automatic position connecting said adjustable and variable signal sources in signal comparing relation to the input of said controller and connecting said utilization circuit to the output of said controller, and means including said switching means when in said manual position for connecting said adjustable signal source directly to said utilization means through a circuit including said second resistor and connecting to the input of said controller a signal from said adjustable signal source by way of said second resistor and from the output of said controller across said first named resistor.

5. Electrical control apparatus comprising, an adjustable signal source, a variable signal source, an electrical controller having reset means therein and having an input and an output, utilization means, switching means having an automatic and manual position, means including said switching means when in the automatic position connecting said adjustable and variable signal sources in opposition to the input of said controller and connecting said utilization circuit to said controller output, a resistor, and means including said switching means when in said manual position connecting said adjustable source directly to said utilization circuit through said resistor, and connecting said resistor to the input of said controller.

6. Electrical control apparatus comprising, an adjustable signal source, a variable signal source, an electrical controller having an input, an output, and reset means in a feedback circuit therein, a signal utilization circuit, switching means having a manual and an automatic position, means including said switching means when in said automatic position connecting said adjustable and variable signal sources to the input of said controller and connecting said utilization circuit to the output of said controller, and means including said switching means when in said manual position connecting said adjustable signal source directly to said utilization circuit and connecting to said controller means for maintaining said reset means in step with said adjustable signal source.

7. Electrical control apparatus comprising, an adjustable signal source, a variable signal source, an electrical controller having an input, an output having a resistor in series therewith, and reset means in a feedback circuit therein, a signal utilization circuit, switching means having a manual and an automatic position, means including said switching means when in said automatic position connecting said adjustable and variable signal sources to the input of said controller and connecting said utilization circuit to the output of said controller, and means including said switching means when in said manual position connecting said adjustable signal source directly to said utilization circuit and connecting to said controller at said resistor an adjustable signal source means for maintaining the output of said controller in step with said adjustable signal source.

8. Electrical control apparatus comprising, an adjustable signal source, a variable signal source, an electrical controller having an input and an output and a reset means connected between the output and input of said controller, a signal utilization circuit, switching means having a manual and automatic position, means including said switching means when in said automatic position connecting said adjustable and variable signal sources to the input of said controller and connecting said utilization circuit to said controller output, means including said switching means when in said manual position connecting said adjustable signal source directly to said utilization circuit, and means including said reset means when said switching means is in said manual position for maintaining the controller output equal to the adjustable signal source so that when said switching means is switched to said automatic position from said manual position said utilization circuit will receive the same signal from said controller as from said adjustable source.

9. Electrical control apparatus comprising, an adjustable signal source, a variable signal source, an electrical controller having an input and an output and a manually adjustable reset means connected between the output and input of said controller, a signal utilization circuit, switching means having a manual and automatic position, means including said switching means when in said automatic position connecting said adjustable and variable sources to the input of said controller and connecting said utilization circuit to said controller output, means including said switching means when in said manual position connecting said adjustable signal source directly to said utilization circuit, and means including said manually adjustable reset means when said switching means is in said manual position for maintaining the controller output equal to the adjustable signal source so that when said switching means is switched to said automatic position from said manual position said utilization circuit will receive the same signal from said controller as from said adjustable source.

10. Electrical control apparatus comprising, an adjustable signal source, a variable signal source, an electrical controller having an input and an output, a negative feedback connection from said output to said input, means connecting said adjustable and variable signal sources in signal comparison relation to said input, means connecting a signal utilization circuit to said output, and a manually adjustable signal source connected in said feedback connection to reset the output of said controller until said first named adjustable signal source is equal to the magnitude of said variable signal source.

11. Electrical apparatus comprising, a set point signal source, a variable signal source, an electrical controller having an input and an output and a reset means connected between said output and said input, a signal utilization circuit, switching means having a manual and an automatic position, means including said switching means when in said automatic position connecting said adjustable and variable signal sources in signal comparison relation to said input and connecting said utilization circuit to said output, means including said switching means when in said manual position connecting said set point source directly to said controller for varying the output of said controller, and indicating means connected between the output of said net point source and said controller for indicating any difference in said outputs.

12. Apparatus as defined in claim 11 wherein said set point source has a resistor in series therewith and said controller output has a resistor in series therewith, and said indicating means comprises an electrical meter connected between said two resistors.

13. Apparatus as defined in claim 11 wherein said set point source is connected by said switching means when in the manual position to said utilization circuit through a resistor in said controller output and said indicating means is an electrical meter connected between said resistor and said reset means.

14. Apparatus for controlling the magnitude of a variable comprising, an adjustable electrical signal source, a variable electrical signal source, an electrical controller having an input and an output and a reset means in a feedback circuit between said output and input, a signal utilization circuit, switching means having a manual and automatic position, means including said switching means when in said automatic position connecting said adjustable and variable signal sources to said input of said controller and connecting said utilization circuit to said output, a second adjustable signal source, means including said switching means when in said manual position connecting said second adjustable source to said utilization circuit, and means including said switching means when in said manual position connecting said reset means to said second adjustable signal source to maintain said reset means in step with the adjustments of said second adjustable source.

15. Apparatus for controlling the magnitude of a variable comprising, an adjustable signal source, a variable signal source, an electrical controller having an input and an output having an output resistor in series therewith and a reset means in a feedback circuit between said output and input, a signal utilization circuit, switching means having a manual and automatic position, means including said switching means when in said automatic position connecting said adjustable and variable signal sources to said input of said controller and connecting said utilization circuit to said output, a second adjustable signal source, means including said switching means when in said manual position connecting said second adjustable source to said utilization circuit through said output resistor, and means including said switching means when in said manual position connecting said reset means to said second adjustable signal source by way of said output resistor to maintain said reset means in step with the adjustments of said second adjustable source.

16. Control apparatus comprising, a first adjustable signal source, a first variable signal source, a first controller having an input and an output, a first signal utilization circuit, means connecting said first adjustable and variable signal sources to said input and connecting said utilization circuit to said output, a second adjustable source, a second variable source, a second controller having an input and an output, switching means having a first position wherein said second adjustable source and said second variable source are connected to the input of said second controller and a second position wherein said second variable source and the utilization circuit of said first controller are connected to the input of said second controller, and a second signal utilization circuit connected to said output of said second controller.

17. Electrical control apparatus comprising, a first adjustable signal source, a variable signal source, an electrical controller having an input and an output, a second adjustable source connected to said controller to vary the output of said controller, and switching means connected to said controller, said switching means when in a first position connecting said first adjustable signal source and variable signal source to the input of said controller, and when in a second position short circuiting the input to said controller so that said second adjustable source is determining the output of said controller.

18. Electrical control apparatus comprising, a first adjustable signal source, a variable signal source, an electrical controller having an input and an output, a second adjustable source connected to said controller to vary the output of said controller, and switching means connected to said controller, said switching means when in a first position connecting said first adjustable signal source and variable signal source to the input of said controller, and when in a second position short circuiting the input to said controller so that said second adjustable source is determining the output of said controller, and when in a third position connecting said first adjustable signal source directly to the output of said controller.

References Cited in the file of this patent
UNITED STATES PATENTS

| 2,644,642 | Smoot | July 7, 1953 |
| 2,666,170 | Davis | Jan. 12, 1954 |
| 2,679,022 | McIlhenny | May 18, 1954 |